United States Patent
Kim et al.

(10) Patent No.: US 10,681,152 B2
(45) Date of Patent: Jun. 9, 2020

(54) METHOD AND DEVICE FOR SUPPORTING SERVICE BY USING APPLICATION SERVICE PLATFORM IN WIRELESS COMMUNICATION SYSTEM

(71) Applicant: LG ELECTRONICS INC., Seoul (KR)

(72) Inventors: Dongcheol Kim, Seoul (KR); Byungjoo Lee, Seoul (KR); Giwon Park, Seoul (KR); Hyunhee Park, Seoul (KR); Taesung Lim, Seoul (KR)

(73) Assignee: LG ELECTRONICS INC., Seoul (KR)

(*) Notice: Subject to any disclaimer, the term of this patent is extended or adjusted under 35 U.S.C. 154(b) by 270 days.

(21) Appl. No.: 15/558,997

(22) PCT Filed: Feb. 17, 2016

(86) PCT No.: PCT/KR2016/001624
§ 371 (c)(1),
(2) Date: Sep. 15, 2017

(87) PCT Pub. No.: WO2016/148406
PCT Pub. Date: Sep. 22, 2016

(65) Prior Publication Data
US 2018/0054492 A1  Feb. 22, 2018

Related U.S. Application Data

(60) Provisional application No. 62/133,940, filed on Mar. 16, 2015, provisional application No. 62/148,108, filed on Apr. 15, 2015.

(51) Int. Cl.
*H04L 29/08* (2006.01)
*H04W 76/10* (2018.01)
(Continued)

(52) U.S. Cl.
CPC ............... *H04L 67/16* (2013.01); *H04W 4/00* (2013.01); *H04W 4/203* (2013.01); *H04W 4/50* (2018.02);
(Continued)

(58) Field of Classification Search
CPC ...... H04L 67/16; H04L 67/104; H04W 48/16; H04W 4/203; H04W 4/60; H04W 4/50;
(Continued)

(56) References Cited

U.S. PATENT DOCUMENTS

2012/0134349 A1  5/2012  Jung et al.
2013/0227152 A1  8/2013  Lee et al.
(Continued)

FOREIGN PATENT DOCUMENTS

WO  WO 2014/123383 A1  8/2014
WO  WO 2015/026179 A1  2/2015

*Primary Examiner* — Philip J Chea
*Assistant Examiner* — Wuji Chen
(74) *Attorney, Agent, or Firm* — Birch, Stewart, Kolasch & Birch, LLP

(57) ABSTRACT

The present specification relates to a method by which a device supports a service by using an application service platform (ASP) in a wireless communication system, and the service supporting method can comprise the steps of: performing a service discovery for a first service by using the ASP; and performing a service connection on the basis of a result of the service discovery, wherein when the ASP supports a plurality of service discovery interfaces and a plurality of service connection interfaces, the service discovery is performed using at least one of the plurality of service discovery interfaces, and the service connection can be performed using at least one of the plurality of service connection interfaces.

12 Claims, 9 Drawing Sheets

(51) Int. Cl.
  *H04W 4/00*   (2018.01)
  *H04W 48/16*  (2009.01)
  *H04W 4/60*   (2018.01)
  *H04W 4/50*   (2018.01)
  *H04W 4/20*   (2018.01)
  H04W 88/06    (2009.01)
  H04W 84/02    (2009.01)

(52) U.S. Cl.
  CPC ............ *H04W 4/60* (2018.02); *H04W 48/16* (2013.01); *H04W 76/10* (2018.02); *H04L 67/104* (2013.01); *H04W 84/02* (2013.01); *H04W 88/06* (2013.01); *Y02D 70/00* (2018.01)

(58) Field of Classification Search
  CPC ....... H04W 76/10; H04W 4/00; H04W 84/02; H04W 88/06; Y02D 70/00
  See application file for complete search history.

(56) References Cited

U.S. PATENT DOCUMENTS

| | | | |
|---|---|---|---|
| 2014/0293978 A1 | 10/2014 | Yang et al. | |
| 2014/0355585 A1* | 12/2014 | Sadeghi | H04W 76/14 370/338 |
| 2015/0373525 A1* | 12/2015 | Yang | H04W 8/005 370/338 |
| 2015/0373765 A1* | 12/2015 | Lee | H04W 76/14 370/329 |
| 2016/0174134 A1* | 6/2016 | Srinivasa Gopalan | H04W 48/14 370/254 |
| 2016/0234301 A1* | 8/2016 | Qi | H04W 4/80 |

\* cited by examiner fist WFD device (cellular phone)  second WFD device (display device)

METHOD AND DEVICE FOR SUPPORTING SERVICE BY USING APPLICATION SERVICE PLATFORM IN WIRELESS COMMUNICATION SYSTEM

CROSS REFERENCE TO RELATED APPLICATIONS

This application is the National Phase of PCT International Application No. PCT/KR2016/001624, filed on Feb. 17, 2016, which claims priority under 35 U.S.C. 119(e) to U.S. Provisional Application No. 62/133,940, filed on Mar. 16, 2015 and No. 62/148,108, filed on Apr. 15, 2015, all of which are hereby expressly incorporated by reference into the present application.

TECHNICAL FIELD

The present specification relates to a wireless communication system, and more particularly, to a method of supporting a service using an application service platform (ASP) in a wireless communication system and an apparatus therefor.

BACKGROUND ART

Wireless access systems have been widely deployed to provide various types of communication services such as voice or data. In general, a wireless access system is a multiple access system that may support communication of multiple users by sharing available system resources (e.g., a bandwidth, transmission power, etc.). For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system, and a multi carrier frequency division multiple access (MC-FDMA) system.

Recently, various wireless communication technologies have been developed with the advancement of information communication technology. Among the wireless communication technologies, a wireless local area network (WLAN) is the technology capable of accessing the Internet by wireless in a home, a company or a specific service provided area through portable device such as a personal digital assistant (PDA), a laptop computer, a portable multimedia player (PMP), etc. based on a radio frequency technology.

A standard for a WLAN (wireless local area network) technology is developing by IEEE (institute of electrical and electronics engineers) 802.11 group. IEEE 802.11a and b use an unlicensed band on 2.4 GHz or 5 GHz, IEEE 802.11b provides transmission speed of 11 Mbps and IEEE 802.11a provides transmission speed of 54 Mbps. IEEE 802.11g provides transmission speed of 54 Mbps by applying OFDM (orthogonal frequency division multiplexing) on 2.4 GHz. IEEE 802.11n provides transmission speed of 300 Mbps by applying MIMO-OFDM (multiple input multiple output-orthogonal frequency division multiplexing). IEEE 802.11n supports a channel bandwidth up to 40 MHz. In this case, transmission speed can be provided as fast as 600 Mbps. IEEE 802.11p corresponds to a standard for supporting WAVE (wireless access in vehicular environments). For instance, 802.11p provides improvement necessary for supporting ITS (intelligent transportation systems). IEEE 802.11ai corresponds to a standard for supporting fast initial link setup of IEEE 802.11 station.

A DLS (direct link setup)-related protocol in wireless LAN environment according to IEEE 802.11e is used on the premise of a QBSS (quality BSS) supporting QoS (quality of service) supported by a BSS (basic service set). In the QBSS, not only a non-AP STA but also an AP corresponds to a QAP (quality AP) supporting QoS. Yet, in current commercialized wireless LAN environment (e.g., wireless LAN environment according to IEEE 802.11a/b/g etc.), although a non-AP STA corresponds to a QSTA (quality STA) supporting QoS, most of APs corresponds to a legacy AP incapable of supporting QoS. Consequently, in the current commercialized wireless LAN environment, there is a limit in that a QSTA is unable to use a DLS service.

In a recent situation that such a wireless short-range communication technology as Wi-Fi and the like is widely applied to a market, connection between devices is performed not only based on a local network but also based on direct connection between devices. One of technologies enabling devices to be directly connected is Wi-Fi Direct.

Wi-Fi Direct corresponds to a network connectivity standard technology describing up to operations of a link layer. Since there is no definition on a regulation or a standard for an application of a higher layer, it is difficult to have compatibility and consistency of an operation after Wi-Fi Direct devices are connected with each other. For this reason, such a standard technology including higher layer application technology as WFDS (Wi-Fi Direct service) is under discussion by WFA (Wi-Fi alliance).

The WFA has announced such a new standard for delivering data via a direct connection between mobile devices as Wi-Fi Direct. Hence, related industries are actively developing a technology for satisfying the Wi-Fi Direct standard. In a strict sense, the Wi-Fi Direct is a marketing terminology and corresponds to a brand name. A technology standard for the Wi-Fi Direct is commonly called Wi-Fi P2P (peer to peer). Hence, the present invention describing Wi-Fi-based P2P technology may be able to use Wi-Fi Direct and Wi-Fi P2P without any distinction. In a legacy Wi-Fi network, a user accesses the legacy Wi-Fi network via an AP (access point) and accesses the Internet to use a device on which Wi-Fi is mounted. A data communication method via direct connection between devices is also used in a legacy communication by some users in a manner of being mounted on a device (e.g., a cellular phone, a note PC, etc.) on which a wireless communication technology such as Bluetooth is mounted. Yet, according to the data communication method, transmission speed is slow and transmission distance is limited to within 10 m. In particular, when the data communication method is used for transmitting massive data or is used in environment at which many Bluetooth devices exist, there exists a technical limit in performance capable of being felt by a user.

Meanwhile, Wi-Fi P2P maintains most of functions of the legacy Wi-Fi standard and includes an additional part for supporting direct communication between devices. Hence, the Wi-Fi P2P can sufficiently utilize hardware and physical characteristics of a device on which a Wi-Fi chip is mounted and is able to provide device-to-device P2P communication by upgrading a software function only.

As widely known, the device on which the Wi-Fi chip is mounted is extending to various ranges including a note PC, a smartphone, a smart TV, a game console, a camera and the like. For the device, sufficient numbers of suppliers and technology development personnel have been formed. Yet, software development supporting the Wi-Fi P2P standard is not vitalized yet. This is because, although a Wi-Fi P2P standard is announced, related software capable of conveniently using the Wi-Fi P2P standard is not distributed.

There exists a device playing a role of an AP in a legacy infrastructure network in a P2P group. The device is called a P2P group owner (GO) in a P2P standard. Various P2P clients may exist on the basis of the P2P GO. One GO exists in a single P2P group only and all remaining devices become client devices.

Recently, the use of Bluetooth, NAN (neighboring awareness networking), and NFC (near field communication) is increasing. Hence, it is necessary to have a method of providing a service in environment in which a plurality of systems or interfaces are provided.

DISCLOSURE OF THE INVENTION

Technical Tasks

One object of the present specification is to provide a method of supporting a service using an application service platform (ASP) in a wireless communication system and an apparatus therefor.

Another object of the present specification is to provide a method of supporting a service using an application service platform (ASP) in consideration of a plurality of interfaces used in a wireless communication system and an apparatus therefor.

The other object of the present specification is to provide an application service platform capable of controlling a plurality of interfaces used in a wireless communication system.

Technical Solution

To achieve these and other advantages and in accordance with the purpose of the present invention, as embodied and broadly described, according to one embodiment, a method of supporting a service, which is supported by a device using an application service platform (ASP) in a wireless communication system, includes the steps of performing a service discovery for a first service using the ASP, and performing a service connection based on a result of the service discovery. In this case, if the ASP supports a plurality of service discovery interfaces and a plurality of service connection interfaces, the service discovery is performed using at least one of a plurality of the service discovery interfaces and the service connection can be performed using at least one of a plurality of the service connection interfaces.

To further achieve these and other advantages and in accordance with the purpose of the present invention, according to a different embodiment, a device using an application service platform (ASP) in a wireless communication system includes a reception module configured to receive information from an external device, a transmission module configured to transmit information to an external device, and a processor configured to control the reception module and the transmission module, the processor configured to perform a service discovery for a first service using the ASP, the processor configured to perform a service connection based on a result of the service discovery. In this case, if the ASP supports a plurality of service discovery interfaces and a plurality of service connection interfaces, the service discovery is performed using at least one of a plurality of the service discovery interfaces and the service connection can be performed using at least one of a plurality of the service connection interfaces.

Following items can be commonly applied to the method of supporting a service using an application service platform (ASP) in a wireless communication system and an apparatus therefor.

According to one embodiment of the present specification, a plurality of the service discovery interfaces can include at least one selected from the group consisting of P2P (peer-to-peer), NAN (neighbor awareness network), BLE (Bluetooth low energy), and NFC (near field communication).

According to a different embodiment of the present specification, a plurality of the service connection interfaces can include at least one of P2P (peer-to-peer) and WLAN (wireless local access network) infrastructure.

According to a further different embodiment of the present specification, the device can receive information on the service discovery interface and the service connection interface capable of supporting the first service from the ASP.

In this case, the device transmits a request message for requesting information supporting the first service to the ASP and can receive the information on the service discovery interface and the service connection interface via a response message in response to the request message.

According to a further different embodiment of the present specification, if the device transmits a request frame for the first service and receives a response frame in response to the request frame, the service discovery for the first service can be performed.

In this case, the request frame and the response frame can include information on the service discovery interface performing the service discovery among a plurality of the service discovery interfaces.

And, the request frame and the response frame can include information on the service connection interface performing the service connection among a plurality of the service connection interfaces.

According to one embodiment of the present specification, when the service discovery for the first service is performed based on a first discovery interface among a plurality of the service discovery interfaces, if it fails to perform the service discovery using the first service discovery interface, a second service discovery interface among a plurality of the service discovery interfaces can be triggered.

In this case, if the first service discovery interface fails to perform the service discovery within first time, the second service discovery interface can be triggered.

According to a different embodiment of the present specification, if the service discovery for the first service is performed via BLE, a Wi-Fi discovery can be further performed. In this case, the device can receive information on a plurality of the service connection interfaces capable of being used for the service connection via the Wi-Fi discovery.

In this case, if a seeker device transmits a first message to an advertiser device via the BLE and the advertiser device transmits a second message to the seeker device via the BLE, the service discovery can be performed. In this case, the first message and the second message can include Wi-Fi discovery capability information capable of performing the Wi-Fi discovery.

And, if the Wi-Fi discovery is performed using WLAN infrastructure, the first message and the second message can further include information on the WLAN infrastructure.

In this case, the information on the WLAN infrastructure can include at least one selected from the group consisting of information on a BSSID, information on a frequency band, and information on a channel.

Advantageous Effects

According to the present specification, it is able to provide a method of supporting a service using an application service platform (ASP) in a wireless communication system and an apparatus therefor.

According to the present specification, it is able to provide a method of supporting a service using an application service platform (ASP) in consideration of a plurality of interfaces used in a wireless communication system and an apparatus therefor.

According to the present specification, it is able to provide an application service platform capable of controlling a plurality of interfaces used in a wireless communication system.

Effects obtainable from the present invention may be non-limited by the above mentioned effect. And, other unmentioned effects can be clearly understood from the following description by those having ordinary skill in the technical field to which the present invention pertains.

BEST MODE

Mode for Invention

Figure 1:
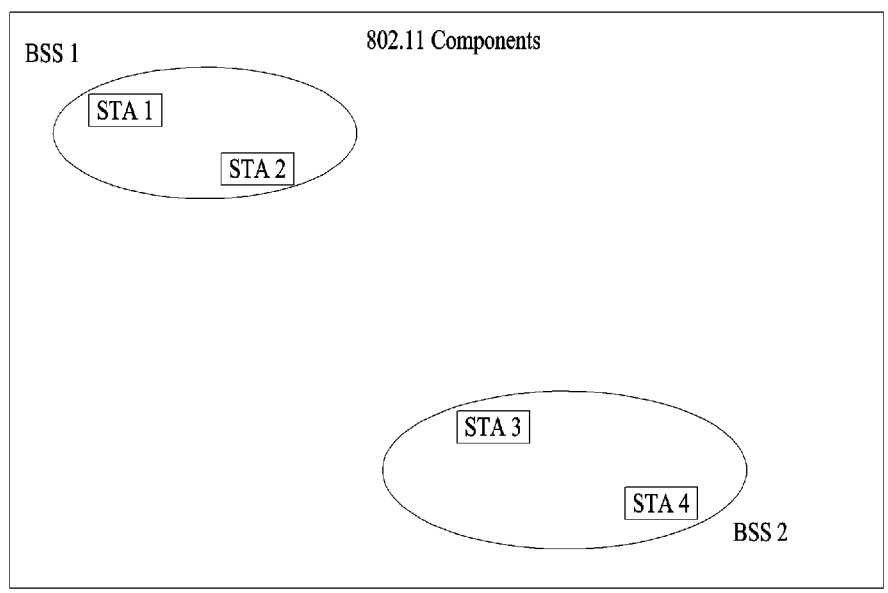
FIG. 1 is a diagram for an example of a structure of IEEE 802.11 system to which the present invention is applicable.

Reference will now be made in detail to the preferred embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention. The following detailed description includes specific details in order to provide the full understanding of the present invention. However, it will be apparent to those skilled in the art that the present invention may be implemented without such specific details.

The following embodiments can be achieved by combinations of structural elements and features of the present invention in prescribed forms. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment.

Specific terminologies in the following description are provided to help the understanding of the present invention. And, these specific terminologies may be changed to other formats within the technical scope or spirit of the present invention.

Occasionally, to avoid obscuring the concept of the present invention, structures and/or devices known to the public may be skipped or represented as block diagrams centering on the core functions of the structures and/or devices. In addition, the same reference numbers will be used throughout the drawings to refer to the same or like parts in this specification.

The embodiments of the present invention can be supported by the disclosed standard documents disclosed for at least one of wireless access systems including IEEE 802 system, 3GPP system, 3GPP LTE system, LTE-A (LTE-Advanced) system and 3GPP2 system. In particular, the steps or parts, which are not explained to clearly reveal the technical idea of the present invention, in the embodiments of the present invention may be supported by the above documents. Moreover, all terminologies disclosed in this document can be supported by the above standard documents.

The following embodiments of the present invention can be applied to a variety of wireless access technologies, for example, CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented with such a radio technology as UTRA (universal terrestrial radio access), CDMA 2000 and the like. TDMA can be implemented with such a radio technology as GSM/GPRS/EDGE (Global System for Mobile communications)/General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc.

Although the terms such as "first" and/or "second" in this specification may be used to describe various elements, it is to be understood that the elements are not limited by such terms. The terms may be used to identify one element from another element. For example, a first element may be referred to as a second element, and vice versa within the range that does not depart from the scope of the present invention.

In the specification, when a part "comprises" or "includes" an element, it means that the part further comprises or includes another element unless otherwise mentioned. Also, the terms " . . . unit", " . . . module" disclosed in the specification means a unit for processing at least one function or operation, and may be implemented by hardware, software or combination of hardware and software.

For clarity, the following description focuses on IEEE 802.11 systems. However, technical features of the present invention are not limited thereto.

FIG. 1 is a diagram for an example of a structure of IEEE 802.11 system to which the present invention is applicable.

IEEE 802.11 structure can consist of a plurality of configuration elements and a WLAN supporting mobility of an STA, which is transparent to an upper layer, can be provided by interaction of a plurality of the configuration elements. A basic service set (hereinafter abbreviated BSS) may correspond to a basic configuration block in IEEE 802.11 LAN. FIG. 1 shows an example that there exist two BSSs (BSS 1 and BSS 2) and two STAs are included in each of the BSSs as members, respectively (STA 1 and STA 2 are included in the BSS 1 and STA 3 and STA 4 are included in the BSS 2). In this case, an STA indicates a device operating according to MAC (medium access control)/PHY (physical) standard of IEEE 802.11. An STA includes an AP (access point) STA (simply, an AP) and a non-AP STA. An AP corresponds to a device providing network access (e.g., WLAN) to a non-AP STA via a wireless interface. The AP can be configured by a fixed form or a mobile form and includes a mobile wireless device (e.g., a laptop computer, a smartphone, etc.) providing a hot-spot. The AP corresponds to a base station (BS), a Node-B, an evolved Node-B (eNB), a base transceiver system (BTS), a femto BS and the like in a different wireless communication field. The non-AP STA corresponds to a device directly controlled by a user such as a laptop computer, a PDA, a wireless modem, a smartphone and the like. The non-AP STA can be called a device, a wireless transmit/receive unit (WTRU), a user equipment (UE), a mobile station (MS), a mobile device, a mobile subscriber station (MSS), and the like.

An oval indicating a BSS in FIG. 1 may be comprehended as a coverage area of the STAs included in the BSS to maintain a communication. This area can be called a basic service area (hereinafter abbreviated BSA). A BSS of a most basic type in IEEE 802.11 LAN may correspond to an independent BSS (hereinafter abbreviated IBSS). For instance, the IBSS may have a minimum form consisting of two STAs only. The BSS (BSS 1 or BSS 2), which is the simplest form and omitted different configuration elements, in FIG. 1 may correspond to a representative example of the IBSS. This sort of configuration is available when the STAs are able to directly communicate with each other. And, this kind of LAN can be configured when a LAN is necessary instead of being configured in advance. Hence, this network may be called an ad-hoc network.

When power of an STA is turned on or turned off or an STA enters into a BSS area or gets out of the BSS area, a membership of the STA in a BSS can be dynamically changed. In order to be a member of the BSS, the STA can join the BSS using a synchronization process. In order to access all services based on a BSS structure, the STA can be associated with the BSS.

Figure 2:
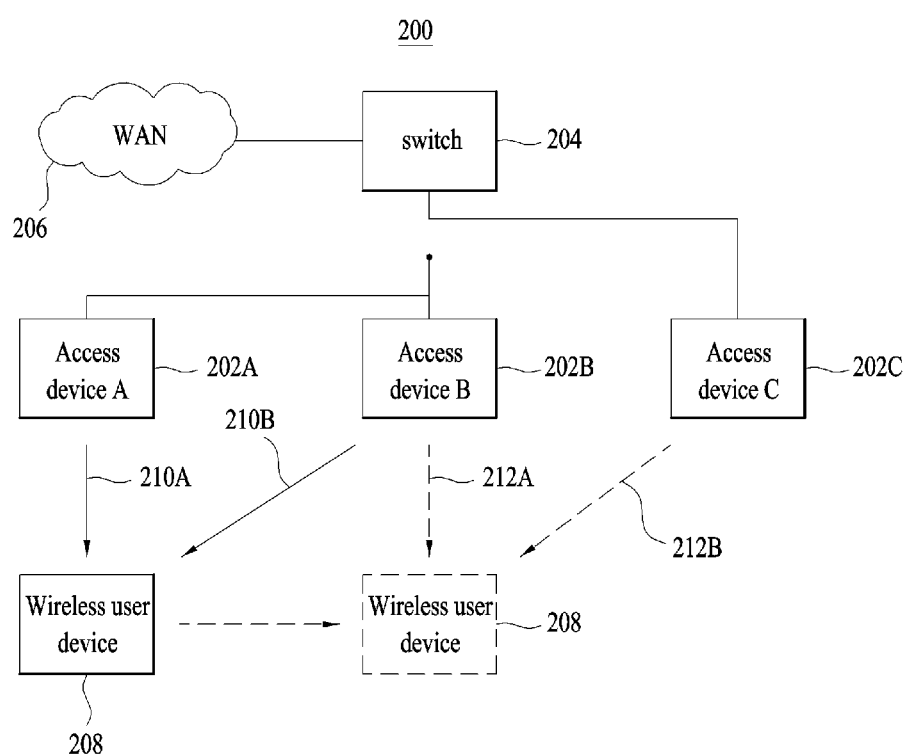
FIG. 2 is a block diagram for an example of operations of a communication system adopting access devices and wireless user devices.

FIG. 2 is a block diagram for an example of a communication system 200 adopting access devices (e.g., AP STAs) 220A/202B/202C and wireless user devices (e.g., non-AP STAs).

Referring to FIG. 2, access devices 202A to 202C are connected with a switch 204 providing access to a WAN (wide area network) 206 such as the Internet. Each of the access devices 202A to 202C provides wireless access to wireless devices belonging to a coverage area (not depicted) of the access device via a time division multiplexed network. Hence, the access devices 202A to 202C commonly provide a total WLAN coverage area of the system 200. For instance, a wireless device 208 may exist in a coverage area of the access devices 202A and 202B in a position represented by a box of a line. Hence, the wireless device 208 can receive beacons from each of the access devices 202A/202B as shown by line arrows 210A and 210B. If the wireless device 208 roams to a dotted line box from the line box, the wireless device 208 enters a coverage area of the access device 202C and leaves a coverage area of the access device 202A. Hence, as shown by dotted lines 212A and 212B, the wireless device 208 can receive beacons from the access devices 202B/202C.

When the wireless device 208 roams in the total WLAN coverage area provided by the system 200, the wireless device 208 can determine which device provides best access to the wireless device 208. For instance, the wireless device 208 repeatedly scans beacons of adjacent access devices and may be able to measure signal strength (e.g., power) related to each of the beacons. Hence, the wireless device 208 can be connected with an access device providing optimal network access based on maximum beacon signal strength. The wireless device 208 may be able to use a different reference related to optimal access. For instance, the optimal access may be associated with more preferable services (e.g., contents, data rate and the like).

Figure 3:
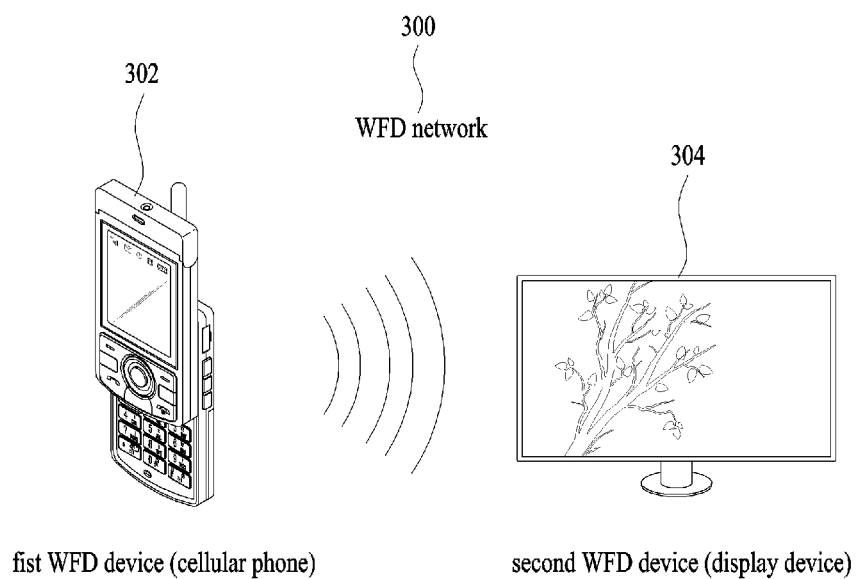
FIG. 3 is a diagram for an example of a WFD (Wi-Fi Direct) network.

FIG. 3 is a diagram for an example of a WFD (Wi-Fi Direct) network.

A WFD network corresponds to a network capable of performing D2D (device-to-device) (or peer to peer (P2P)) communication although Wi-Fi devices do not participate in a home network, an office network or a hot-spot network. The WFD network is proposed by Wi-Fi alliance. In the following, WFD-based communication is called WFD D2D communication (simply, D2D communication) or WFD P2P communication (simply, P2P communication). And, a device performing the WFD P2P communication is called a WFD P2P device, simply, a P2P device.

Referring to FIG. 3, a WFD network 300 can include at least one or more Wi-Fi devices including a first WFD device 302 and a second WFD device 304. A WFD device includes devices supporting Wi-Fi such as a display device, a printer, a digital camera, a projector, a smartphone and the like. And, the WFD device includes a non-AP STA and an AP STA. Referring to an example shown in the drawing, the first WFD device 302 corresponds to a smartphone and the second WFD device 304 corresponds to a display device. WFD devices in the WFD network can be directly connected with each other. Specifically, P2P communication may correspond to a case that a signal transmission path between two WFD devices is directly configured between the WFD devices without passing through a third device (e.g., an AP) or a legacy network (e.g., access WLAN via an AP). In this case, the signal transmission path directly configured between the two WFD devices may be restricted to a data transmission path. For instance, P2P communication may correspond to a case that a plurality of non-STAs transmit data (e.g., audio/image/text message information etc.) without passing through an AP. A signal transmission path for control information (e.g., resource allocation information for P2P configuration, wireless device identification information and the like) can be directly configured between WFD devices (e.g., between a non-AP STA and a non-AP STA, between a non-AP STA and an AP), between two WFD devices (e.g., between a non-AP STA and a non-AP STA) via an AP or between an AP and a corresponding WFD device (e.g., an AP and a non-AP STA #1, between an AP and a non-AP STA #2).

Figure 4:
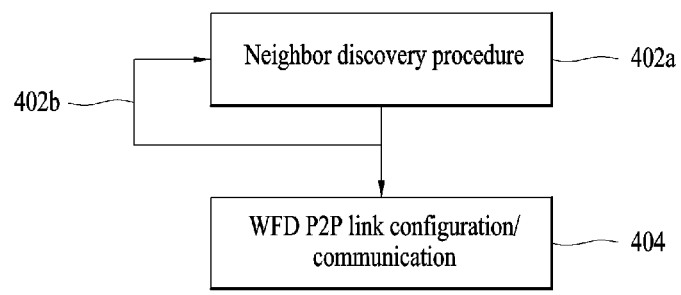
FIG. 4 is a flowchart for an example of a process of configuring a WFD network.

FIG. 4 is a flowchart for an example of a procedure of configuring a WFD network.

Referring to FIG. 4, a procedure of configuring a WFD network can be mainly divided into two procedures. A first procedure corresponds to a neighbor (device) discovery (ND) procedure [S402a] and a second procedure corresponds to a P2P link configuration and communication procedure [S404]. A WFD device (e.g., 302 in FIG. 3) finds out a different neighboring device (e.g., 304 in FIG. 3) in coverage (of the WFD device) via the neighbor discovery procedure and may be able to obtain information necessary for associating with the neighboring WFD device, e.g., information necessary for pre-association. In this case, the pre-association may indicate second layer pre-association in a wireless protocol. The information necessary for the pre-association can include identification information on the neighboring WFD device for example. The neighbor discovery procedure can be performed according to an available radio channel [S402b]. Subsequently, the WFD device 302 can perform a WFD P2P link configuration/communication procedure with the different WFD device 304. For instance, the WFD device 302 can determine whether the WFD device 304 corresponds to a WFD device not satisfying a service requirement of a user after the WFD device 302 is connected with the neighboring WFD device 304. To this end, the WFD device 302 is second layer pre-associated with the neighboring WFD device 304 and may be then able to search for the WFD device 304. If the WFD device 304 does not satisfy the service requirement of the user, the WFD device 302 disconnects the second layer connection established with the WFD device 304 and may be able to establish the second layer connection with a different WFD device. On the contrary, if the WFD device 304 satisfies the service requirement of the user, the two WFD devices 302/304 can transceive a signal with each other via a P2P link.

Figure 5:
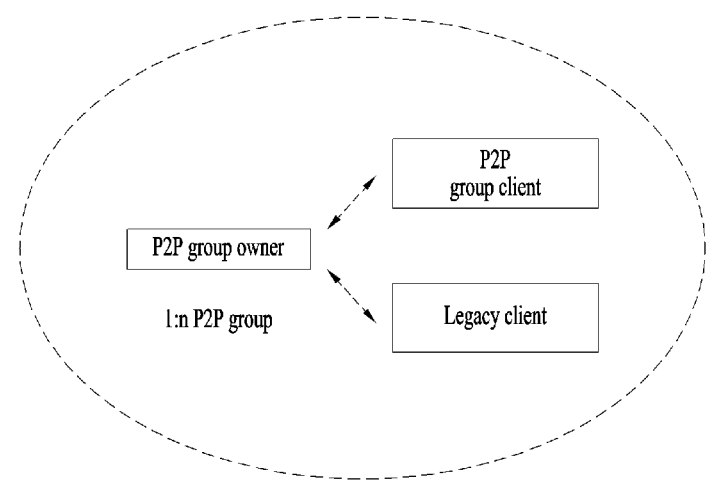
FIG. 5 is a diagram for a typical P2P network topology.

FIG. 5 is a diagram for a typical P2P network topology.

As shown in FIG. 5, a P2P GO can be directly connected with a client including a P2P function. Or, the P2P GO can be connected with a legacy client, which has no P2P function.

Figure 6:
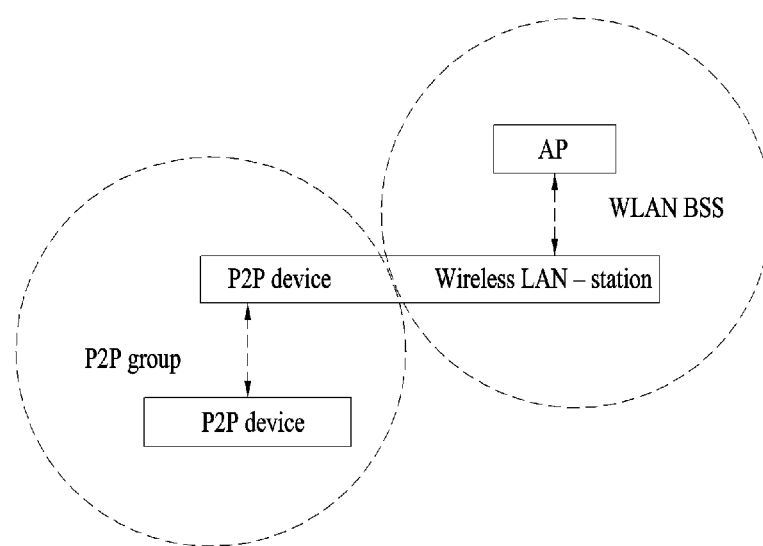
FIG. 6 is a diagram for a situation that a single P2P device forms a P2P group and is connected with an AP in a manner of operating as an STA of WLAN at the same time.

FIG. 6 is a diagram for a situation that a single P2P device forms a P2P group and is connected with an AP in a manner of operating as an STA of WLAN at the same time.

As shown in FIG. 6, according to P2P technical standard, a situation that a P2P device operates in the aforementioned mode is defined as a concurrent operation.

In order for a series of P2P devices to form a group, a P2P GO is determined based on a group owner intent value of a P2P attribute ID. The group owner intent value may have a value ranging from 0 to 15. P2P devices are exchanging the values and a P2P device including a highest value becomes the P2P GO. Meanwhile, in case of a legacy device not supporting the Wi-Fi P2P technology, although the legacy device can belong to a P2P group, a function of the legacy device is limited to a function of accessing an infrastructure network via the P2P GO.

According to Wi-Fi P2P standard, since a P2P GO transmits a beacon signal using OFDM (orthogonal frequency division multiplexing), a P2P device does not support 11b standard. Instead, 11a/g/n can be used as Wi-Fi P2P device.

In order to perform an operation of connecting a P2P GO and a P2P client with each other, a P2P standard mainly includes 4 functions described in the following.

First of all, P2P discovery is dealing with such a description entry as device discovery, service discovery, group formation and P2P invitation. According to the device discovery, 2 P2P devices exchange device-related information such as a device name of a counterpart device or a device type with each other via an identical channel. According to the service discovery, a service to be used and service-related information are exchanged with each other via P2P. According to the group formation, it corresponds to a function that a device to be a P2P GO is determined and a new group is formed. According to the P2P invitation, it corresponds to a function that a permanently formed P2P group is summoned or a function of making a P2P device join a legacy P2P group.

Secondly, P2P group operation explains P2P group formation and termination, connection to a P2P group, communication in a P2P group, a service for P2P client discovery, operation of a persistent P2P group and the like.

Thirdly, P2P power management is dealing with a method of managing power of a P2P device and a method of processing a signal on power saving mode timing.

Lastly, managed P2P device is dealing with a method of forming a P2P group in a single P2P device and a method of accessing an infrastructure network via a WLAN AP at the same time.

Characteristics of a P2P group are explained in the following. A P2P group is similar to a legacy infrastructure BSS (basic service set) in that a P2P GO plays a role of an AP and a P2P client plays a role of an STA. Hence, software capable of performing a role of a GO and a role of a client should be mounted on a P2P device. The P2P device is distinguished by using a P2P device address such as a MAC address. Yet, when the P2P device performs communication in a P2P group, the P2P device uses a P2P interface address. In this case, it is not necessary for the P2P device to use a single identifier (a globally unique ID) address. The P2P group includes a single identifier P2P group ID. The single identifier P2P group ID consists of a combination of an SSID (service set identifier) and a P2P device address. Wi-Fi P2P standard uses WPA2-PSK/AES for security. A life cycle of a P2P group has a temporary connection method and a persistent connection method for attempting an identical connection after prescribed time. In case of a persistent group, once a P2P group is formed, a role, a certificate, an SSID and a P2P group ID are cached. When connection is reestablished, connection of a group can be promptly established by applying an identical connection form.

In the following, Wi-Fi P2P connection method is explained. A Wi-Fi device mainly performs a connection procedure of two phases. First one corresponds to a phase that two P2P devices find out a counterpart device and a second one corresponds to a group formation phase for determining a role of a P2P GO or a role of a P2P client between discovered devices. First of all, the finding phase corresponds to a phase of connecting P2P devices with each other. In particular, the finding phase includes a search state and a listen state. The search state performs active search using a probe request frame. In this case, a range of the search is restricted for a quick search. For the quick search, such a social channel as a channel 1, 6 and 11 are used. A P2P device of the listen state maintains a reception state in a manner of selecting one channel from the 3 social channels. If the P2P device receives a probe request frame transmitted by a different P2P device of the search state, the P2P device transmits a probe response frame to the different P2P device in response to the probe request frame. P2P devices continuously repeat the search state and the listen state and may be able to arrive at a channel common to the P2P devices. The P2P devices find out a counterpart device and use a probe request frame and a probe response frame to selectively combine with the counterpart device and to discover a device type, a manufacturer, or a friendly device name. In order to check a service existing in the internal of the P2P devices and compatible between the devices, it may use the service discovery. The service discovery is used to determine whether a service provided in the internal of each device is compatible with a different device. According to the P2P standard, a specific service discovery standard is not designated. A user of a P2P device searches for a neighboring P2P device and a service provided by the P2P device and may be then able to connect with a device or a service preferred by the user.

As a second phase, a group formation phase is explained in the following. If a P2P device completes the aforementioned find phase, checking existence of a counterpart device is completed. Based on this, two P2P devices should enter a GO negotiation phase to configure a BSS. The negotiation phase is divided into two sub phases. One is a GO negotiation phase and another is a WPS (Wi-Fi protected setup) phase. In the GO negotiation phase, the two P2P devices negotiate a role of a P2P GO and a role of a P2P client with each other and an operation channel to be used in the internal of a P2P group is configured. In the WPS phase, such a usual job performed in a legacy WPS as exchanging PIN information inputted by a user using a keypad or the like, simple setup via a push button and the like is performed. In a P2P group, a P2P GO plays core role of the P2P group. The P2P GO assigns a P2P interface address, selects an operation channel of the group and transmits a beacon signal including various operation parameters of the group. In the P2P group, a beacon signal can be transmitted by the P2P GO only. A P2P device can quickly check the P2P GO using the beacon signal in a scan phase corresponding to a connection initial phase and performs a role of participating in the group. Or, the P2P GO can initiate a P2P group session by itself or may be able to initiate a session after the method mentioned earlier in the P2P finding phase is performed. Hence, since a value intended to be the P2P GO is controlled by an application or a higher layer service instead of a value fixed by a certain device, a developer can select an appropriate value, which is intended to be the P2P GO, according to a usage of each application program.

Subsequently, P2P addressing is explained in the following. A P2P device uses a P2P interface address in a manner of assigning a P2P interface address using a MAC address in a P2P group session. In this case, the P2P interface address of a P2P GO corresponds to a BSSID (BSS identifier). The BSSID practically corresponds to a MAC address of the P2P GO.

Connection release of a P2P group is explained in the following. If a P2P session is terminated, a P2P GO should inform all P2P clients of termination of a P2P group session via De-authentication. A P2P client can also inform the P2P GO of connection release. In this case, if possible, it is necessary to perform a disassociation procedure. Having received a connection release request of a client, the P2P GO can identify that connection of the P2P client is released. If the P2P GO detects a P2P client making a protocol error or performing an operation of interrupting connection of a P2P group, the P2P GO generates rejection of authentication or a denial of association. In this case, the P2P GO records a concrete failure reason on an association response and transmits the association response to the P2P client.

Figure 7:
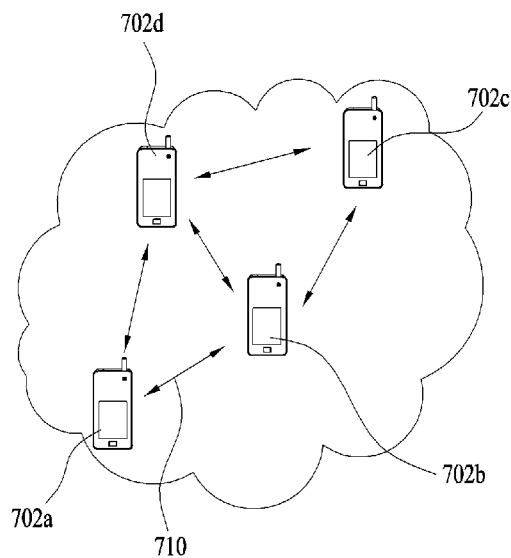
FIG. 7 is a diagram for a WFD network aspect in case that P2P is applied.

FIG. 7 is a diagram for a WFD network aspect in case that P2P is applied.

FIG. 7 shows an example of a WFD network aspect in case of applying a new P2P application (e.g., social chatting, location-based service provision, game interworking and the like). Referring to FIG. 7, a plurality of P2P devices 702a to 702d perform P2P communication 710 in a WFD network. P2P device(s) constructing the WFD network frequently change due to movement of the P2P device or the WFD network itself can be newly generated or disappeared dynamically/in a short time. Hence, characteristic of the new P2P application part is in that P2P communication can be performed and terminated dynamically/in a short time between a plurality of the P2P devices in dense network environment.

Figure 8:
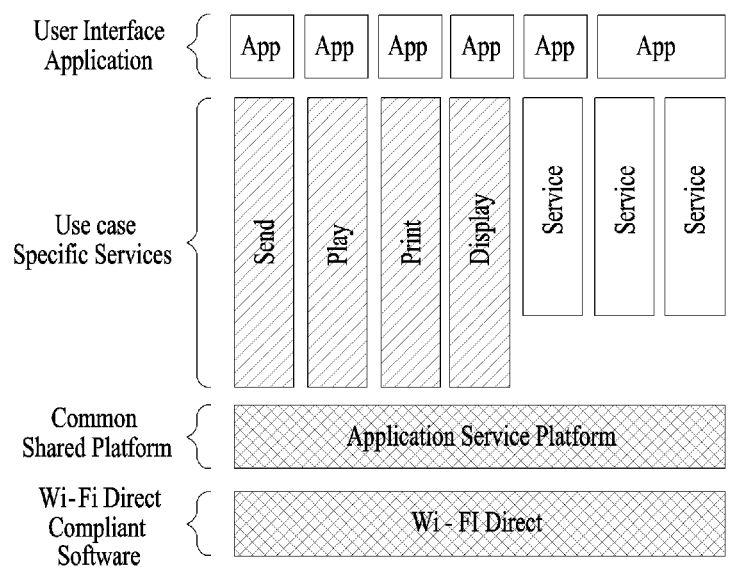
FIG. 8 is a simplified block diagram for a WFDS (Wi-Fi Direct services) device.

FIG. 8 is a simplified block diagram for a WFDS (Wi-Fi Direct services) device.

A platform for such an application service as an ASP (application service platform) is defined for a Wi-Fi Direct MAC layer and above. The ASP plays a role of session management, command processing of a service, control between ASPs and security between a higher application and a lower Wi-Fi Direct. 4 basic services including a Send service, a Play service, a Display service and a Print service defined by WFDS, a corresponding application and an UI (user interface) are supported at the top of the ASP. In this case, the Send service corresponds to a service capable of performing file transfer between two WFDS devices and an application therefor. The Play service corresponds to a streaming service capable of sharing A/V, a picture, and music based on a DLNA between two WFDS devices and an application therefor. The Print service defines a service capable of outputting a document and a picture between a device including contents such as a document, a picture and the like and a printer and an application therefor. The Display service defines a service enabling screen sharing between Miracast source of WFA and Miracast sink and an application therefor. And, an enablement service is defined for the use of an ASP common platform in case of supporting a third party application except a basic service.

Among terminologies described in the present invention, such a terminology as a service hash is formed from a service name using a first 6 octets of a service hash algorithm (e.g., SHA256 hashing) of a service name. A service hash used by the present invention does not mean a specific service hash. Instead, it may be preferable to comprehend the service hash as a sufficient representation of a service name using a probe request/response discovery mechanism. As a simple example, if a service name corresponds to "org.wifi.example", 6 bytes of a forepart of a value of which the service name is hashed by the SHA256 corresponds to a hash value.

In WFDS, if a hash value is included in a probe request message and a service is matched with each other, it may be able to check whether the service is supported in a manner of responding by a probe response message including a service name. In particular, the service name corresponds to a name of a user readable service of a DNS form. A service hash value indicates upper 6 bytes among a value of 256 bytes of the service name generated by an algorithm (e.g., SHA256). As mentioned in the foregoing example, if a service name corresponds to "org.wifi.example", a service hash may correspond to a value of "4e-ce-7e-64-39-49".

Hence, a part of a value of which a service name is hashed by an algorithm is represented as a service hash (information) in the present invention. The service hash can be included in a message as information.

Method of Configuring Legacy WFDS

Figure 9:
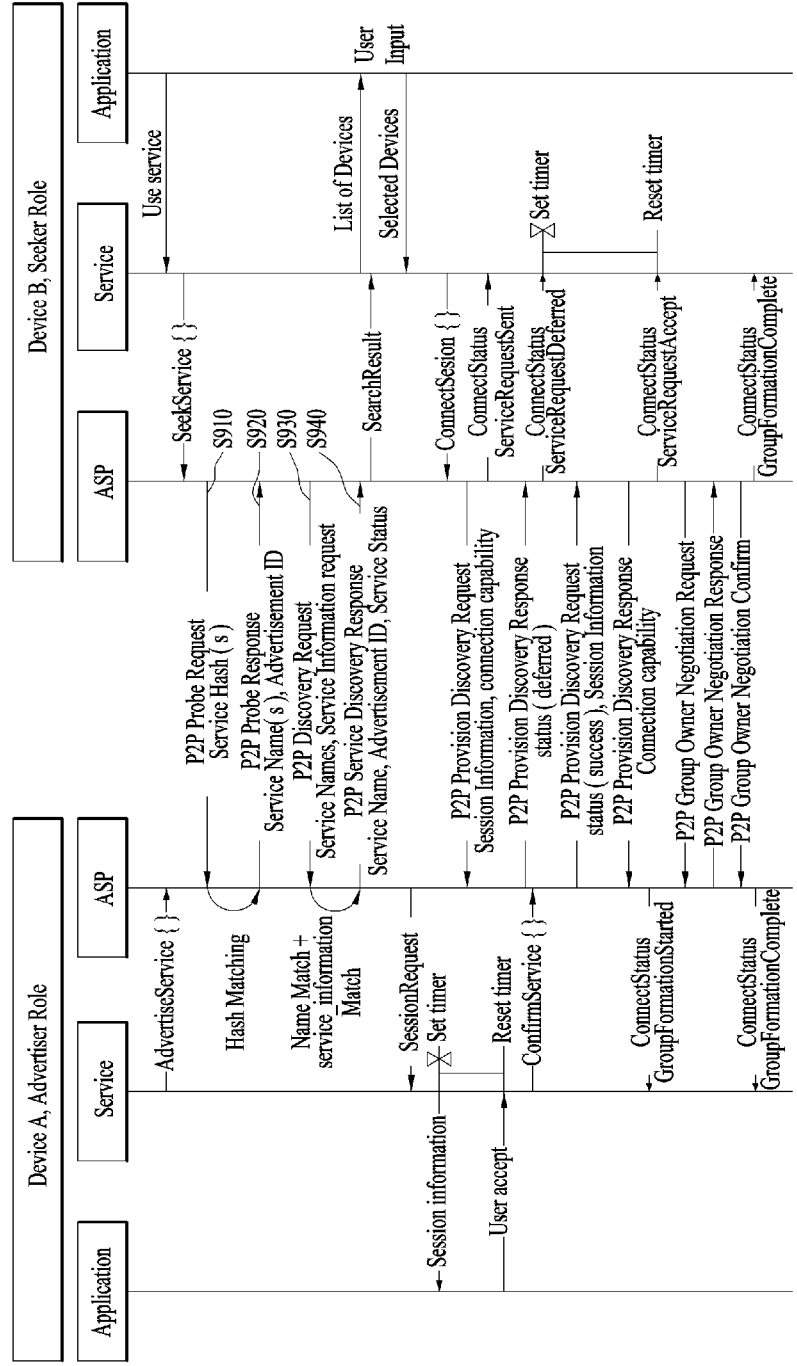
FIG. 9 is a flowchart for a process of establishing a WFDS session by discovering a device and a service between WFDS devices in a legacy WFDS.

FIG. 9 is a flowchart for a process of establishing a WFDS session by discovering a device and a service between WFDS devices in a legacy WFDS.

For clarity, as shown in FIG. 4, assume that a device A plays a role of an advertiser advertising a WFDS capable of being provided by the device A to a seeker and a device B plays a role in seeking an advertised service. The device A corresponds to a device intending to advertise a service of the device A and a counterpart device intends to start the service in a manner of finding out the service of the device A. The device B performs a procedure of finding out a device supporting a service according to a request of a higher application or a user.

A service end of the device A advertises a WFDS capable of being provided by the service end to an application service platform (ASP) end of the device A. A service end of the device B can also advertise a WFDS capable of being provided by the service end to an ASP end of the device B. In order for the device B to use a WFDS as a seeker, an application end of the device B indicates a service to be used to the service end and the service end indicates the ASP end to find out a target device to use the WFDS.

In order to find out the target device to use the WFDS, the ASP end of the device B transmits a P2P (peer to peer) probe request message [S910]. In this case, the P2P probe request message includes a service name, which is intended to be found out by the ASP end of the device B or is capable of being supported by the ASP end of the device B, in a service hash form in a manner of hashing the service name. Having received the P2P probe request message from the seeker, if the device A supports the corresponding service, the device A transmits a P2P probe response message to the device B in response to the P2P probe request message [S920]. The P2P probe response message includes a service supported by a service name or a hash value and a corresponding advertise ID value. This procedure corresponds to a device discovery procedure indicating that the device A and the device B are WFDS devices. It is able to know whether a service is supported via the device discovery procedure.

Subsequently, it is able to know a specific service in detail via a P2P service discovery procedure, optionally. The device B, which has found a device capable of performing a WFDS with the device B, transmits a P2P service discovery request message to the device [S930]. Having received the P2P service discovery request message from the device B, the ASP end of the device A transmits a P2P service discovery response message to the device B in a manner of matching the service advertised by the service end of the device A with a P2P service name and a P2P service information received from the device B with each other [S940]. In this case, a GAS protocol defined by IEEE 802.11u is used. As mentioned in the foregoing description, when a request for a service search is completed, the device B can inform an application and a user of a search result. At this point, a group of Wi-Fi Direct is not formed yet. If a user selects a service and the selected service performs a connect session, P2P group formation is performed.

Before the present invention is explained, it is necessary to be cautious of one thing. It is necessary to distinguish a legacy Wi-Fi Direct connection from Wi-Fi Direct service (WFDS) connection described in the present invention. According to the legacy Wi-Fi Direct, it mainly concerns up to a L2 layer, whereas the recently discussed WFDS connection concerns not only the L2 layer but also a higher layer of the L2 layer. In particular, the WFDS connection is dealing with a service session connection performed by an application service platform. Hence, the WFDS connection may have more diversified and more complex cases compared to the legacy L2 layer connection and it is required to have definition on the cases. In addition, in case of connecting Wi-Fi Direct only between devices and in case of connecting Wi-Fi Direct service between devices, configuration and order of a control frame, which is exchanged via Wi-Fi, may become different.

In this case, for example, among the aforementioned interfaces, the BLE may correspond to a Bluetooth transmission/reception scheme in a form of using a frequency of 2.4 GHz and reducing power consumption. In particular, in order to quickly transmit and receive data of extremely small capacity, it may use the BLE to transmit data while reducing power consumption.

And, for example, the NAN (neighbor awareness networking) network may correspond to NAN devices using a set of the same NAN parameters (e.g., a time period between continuous discovery windows, a period of a discovery window, a beacon interval, a NAN channel, etc.). The NAN devices can configure a NAN cluster. In this case, the NAN cluster uses a set of the same NAN parameters and may correspond to a set of NAN devices synchronized with the same window schedule. A NAN device belonging to the NAN cluster can directly transmit a multicast/unicast NAN service discovery frame to a different NAN device within a range of a discovery window.

And, for example, the NFC may operate on a relatively low frequency band such as 13.56 MHz. In this case, if two P2P devices support the NFC, it may optionally use an NFC channel. A seeker P2P device can discover a P2P device using the NFC channel. When an NFC device is discovered, it may indicate that two P2P devices agree on a common channel for forming a group and share provisioning information such as a password of a device.

A method of interworking via an ASP for the aforementioned interfaces is explained in detail in the following. In this case, although the abovementioned configurations are proposed as an interface capable of being interlocked with the ASP, this is an example only. It may support a different interface as well, by which the present invention may be non-limited.

Figure 10:
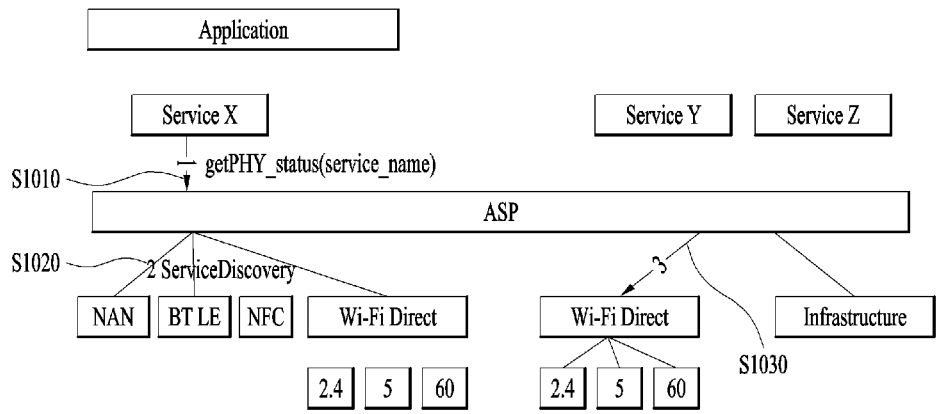
FIG. 10 is a diagram for a service application platform (ASP) supporting a plurality of interfaces.

FIG. 10 is a diagram for a service application platform (ASP) supporting a plurality of interfaces.

As mentioned in the foregoing description, a service end of an advertiser device corresponding to a device supporting WFDS advertises a service capable of being provided by the service end and a service end of a seeker device corresponding to a different device supporting the WFDS can indicate an ASP end to search for a target device for which the service is to be used. In particular, it may be able to support the WFDS between devices via the ASP.

In this case, referring to FIG. 10, the ASP can support a plurality of interfaces. In this case, for example, the ASP can support a plurality of interfaces for performing service discovery. And, the ASP can support a plurality of interfaces for performing service connection.

In this case, for example, a plurality of the interfaces for performing the service discovery may correspond to at least one selected from the group consisting of Wi-Fi Direct, NAN (Neighbor Awareness Networking), NFC (Near Field Communication), BLE (Bluetooth Low Energy), and WLAN Infrastructure.

And, a plurality of the interfaces for performing the service connection may correspond to at least one selected from the group consisting of Wi-Pi Direct, P2P, and Infrastructure. And, for example, the ASP can support a plurality of frequency bands. In this case, for example, a plurality of the frequency bands may correspond to 2.4 GHz, 5 GHz, 60 GHz, and the like. And, for example, the ASP can support information on a frequency band less than 1 GHz. In particular, the ASP can support a plurality of frequency band and is not restricted to a specific frequency band.

Referring to FIG. 10, a first device can perform device discovery or service discovery on a first service using the ASP. Subsequently, if searching for the device discovery or the service discovery is completed, it may perform service connection based on a search result. In this case, for example, an interface used for performing the service discovery may be different from an interface used for performing the service connection. The interfaces can be selected from among a plurality of interfaces.

In this case, it may be necessary to define information or a parameter for supporting a plurality of the interfaces in the ASP. In the following, information or a parameter for providing a service using the ASP supporting a plurality of interfaces is described.

Regarding the ASP, for example, a service end of a device can obtain information on a service discovery method capable of supporting a first service and a connection method from the ASP. In this case, the first service may correspond to a service provided by the device and is not restricted to a specific service.

The service end of the device can call AdvertiseService( ) or SeekService( ) method to the ASP based on the information obtained from the ASP. In particular, similar to a legacy ASP operation, the device can use the ASP as an advertiser or a seeker to perform service discovery on the first service. After the service discovery is performed on the first service, the device can perform service connection based on a result of the service discovery. In this case, the service connection may correspond to a P2P or a WLAN infrastructure. In this case, for example, since both the service connections support a plurality of frequency bands, the service connection can be performed on the basis of a preferred band.

More specifically, referring to FIG. 10, the service end of the device can transmit a message for a service to be used by the device to the ASP by calling getPHY_status (service_name) method. In this case, the service end receives a return value from the ASP and may be able to obtain information on a plurality of frequency bands for a service discovery method and a service connection method supported by the ASP. By doing so, the device informs the ASP of information on a preferred connection method for a service and a preferred frequency band for the service and the device can obtain information on a service discovery method and a service connection method supported by the ASP. The ASP performs service discovery based on the information received from the service end, searches for a specific device, and connects the specific device with the ASP to use a service.

In this case, for example, information described in Table 1 can be included in the aforementioned getPHY_status (service_name). In this case, Table 1 includes information on an upper concept at the left of Table 1 and includes information on a lower concept at the right of Table 1.

TABLE 1

| Connectivity methods | P2P | Multiband information | 2.4, 5, 60 GHz |
| --- | --- | --- | --- |
| | Infrastructure information | Multiband information | BSSID 2.4, 5, 60 GHz Channel Index per band |
| Service Discovery methods | NAN BTLE NFC Infrastructure | | |
| P2P | | Multiband information | 2.4, 5, 60 GHz |

Figure 11:
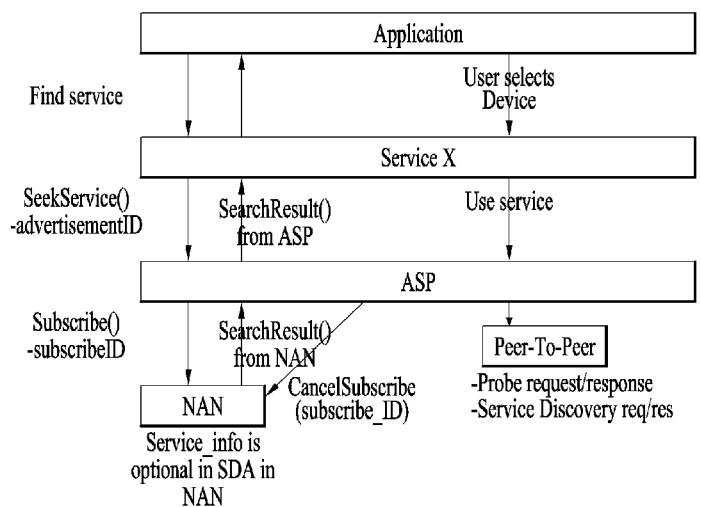
FIG. 11 is a diagram of a method for a device to perform a service discovery and a device discovery using a service application platform.

FIG. 11 is a diagram of a method for a device to perform a service discovery and a device discovery using a service application platform.

A device can perform a service X on an application. In this case, an application end of the device may ask a service end to search for the service X corresponding to a specific service. In this case, the service end can call a method for searching for the service to the ASP. In this case, for example, the device corresponding to a seeker device may call seekservice( ) method and may be able to search for an advertiser device using an advertisement ID. In this case, for example, the method can be transmitted through a P2P probe request message. In this case, the P2P probe request message includes a service_name of a service, which is intended to be found out by the ASP or is capable of being supported by the ASP, in a service hash form in a manner of hashing the service_name. Having received the P2P probe request message from the seeker, if a different device supports the service X, the different device can transmit a P2P probe response message in response to the P2P probe request message. In this case, the P2P probe response message can include a service supported by a service_name or a hash value and a corresponding advertisement ID value.

In this case, for example, the ASP can use at least one of a plurality of interfaces as a service discovery procedure. In this case, the ASP can use an interference preferred by the ASP among service discovery interfaces supporting the service X. In this case, for example, as mentioned in the foregoing description, information on the preferred interface can be obtained from the service end. As a different example, the ASP can perform a service discovery by independently selecting a service discovery interface, by which the present invention may be non-limited.

In this case, in FIG. 11, the ASP can perform a service discovery using NAN as an interface. Subsequently, the ASP obtains a result of the service discovery and can report information on the result of the service discovery to the service end of the device. The service end of the device can report the information on the result of the service discovery to an application end. By doing so, the device can perform a device discovery or a service discovery on the service X of the application. In this case, the ASP can perform a service discovery using at least one of a plurality of interfaces. Subsequently, the service end of the device obtains information on a device selected as the application end and can provide a service via the device. In this case, the ASP performs a service connection using an interface different from the interface used for performing the service discovery to provide a service. And, for example, since the service discovery has been completed, the ASP calls a method for terminating the service discovery to terminate the service discovery.

And, for example, in FIG. 11, the service X of the device selects P2P as a service connection interface via the ASP to provide a service. In this case, the device can support the service X via the connected P2P.

Regarding the aforementioned configuration, since a legacy ASP includes a parameter and information on WFDS only, it is difficult for the legacy ASP to interwork with a different interface. Hence, when the ASP supports a plurality of interfaces, it is necessary to add information or a parameter for each of a plurality of the interfaces.

More specifically, when a device corresponding to an advertiser device calls advertiseService( ) method and indicates the method to the ASP, it may add parameters or information in consideration of a plurality of interfaces.

In this case, for example, the information or parameters included in the advertiseService( ) may correspond to AdvertiseService (service_name, auto_accept, service_information, service_status, network_role, network_config, deferred_session_response, SD_advertise). In particular, the advertiseService( ) method can include various information. In this case, for example, information or a parameter for each of a plurality of the interfaces can be added in consideration of environment in which a plurality of the interfaces exist.

For example, the service_information included in the advertiseService( ) method can include information shown in Table 2 in the following.

TABLE 2

| Service information | Preferred band for P2P Preferred band for WLAN Infrastructure | |
|---|---|---|
| | Connectivity method | P2P WLAN Infrastructure |
| | Service network type | IPv4 IPv6 MAC address |

And, for example, the SD_advertise included in the advertiseService( ) method can include information shown in Table 3 in the following.

TABLE 3

| SD advertise | SD combination information | Value or bitmap |
|---|---|---|
| | WLAN Infrastructure (If presents) | Service_name Service_status Service_information Preferred band Multiband operation Connectivity methods Transport mode for ASP coordination protocol |
| | P2P (if presents) | Identical to parameter used in P2P of legacy WFDS service_name auto_accept service_information service_status network_role network_config deferred_session_response Parameter capable of being added Size of reception signal (received signal strength(RSS) or received signal strength indicator(RSSI)) ranging parameter |
| | BTLE (if presents) | Service_name/service_hash Service_information (Information identical to the above is included Service_status Preferred connectivity method/band Connectivity method |

TABLE 3-continued

| NAN (if presents) | Obtain parameter value necessary for calling Publish( ) method from ASP and return retuned value of Publish( ) to ASP ASP controls CancelPublish( ), Follow-up Transmit( ) using relation between Advertisement ID and Publish_id |
|---|---|

And, for example, parameters for calling Publish( ) method of NAN can be summarized as Table 4 in the following.

TABLE 4

- matching_filter_tx,
- matching_filter_rx
- configuration_parameters
  A. Publish type
     i. Determines the type of Publishing as follows
        1. Unsolicited transmissions only
        2. Solicited transmissions only
        3. Both unsolicited and solicited transmissions
  B. Discovery range
     i. Determines whether the service is made discoverable in close proximity only or to any NAN Devices within range
  C. Solicited transmission type
     i. Determines whether a solicited transmission is a unicast or a broadcast transmission
  D. Announcement period
     i. Recommended periodicity of unsolicited transmissions
  E. Time to live
     i. The instance of the Publish function can be commanded to run for a given time interval or for one transmission only
  F. Event conditions
     i. Determines when Publish related events are generated. Events can be requested to be generated on each solicited transmission. Alternatively, no events are expected.
  G. Matching filter flag
     i. Zero (0) if matching_filter_tx is equal to matching_filter_rx
     ii. One (1) if matching_filter_tx is not equal to matching_filter_rx In particular, when a device corresponding to an advertiser device calls advertiseservice( ) method and indicate the method to the ASP, information on an interface among a plurality of interfaces supported by the ASP can be included in the advertiseservice( ) method. As a different example, when a device corresponding to an advertiser device provides information on an interface preferred for a service X corresponding to a specific service to the ASP, the information on the preferred interface can be included in the advertiseservice( ) method only. In particular, information on an interface necessary for performing a service discovery of a device can be included in the advertiseservice( ) method.

And, when a device corresponding to a seeker device calls seekservice( ) method and indicates the method to the ASP, a similar process can be applied. In this case, the seekservice( ) method corresponds to SeekService (service_name, exact_search, mac_address, service_information_request, SD_seek) and may include a parameter or information. In this case, the information or the parameter included in the seekservice( ) method may be similar to the advertiseservice( ) method. The information or the parameter included in the seekservice( ) method is shown in Table 5 in the following.

TABLE 5

| SD_seek | SD combination information | Value or bitmap |
|---|---|---|
| | WLAN Infrastructure (If presents) | Service name |
| | | STA address of WLAN Infrastructure |
| | | Service_information_request |
| | | Preferred band |
| | | Multiband operation |
| | | Connectivity methods |
| | | Transport mode for ASP coordination protocol |
| | BTLE (if presents) | Service name/service_hash |
| | | Service_information request |
| | | Preferred connectivity method/band |
| | | Connectivity method |
| | | MAC address of P2P device per band |
| | | MAC address of STA of WLAN Infrastructureper band |
| | NAN (if presents) | If Subscriber( ) is performed, subscribe_id is returned to ASP |
| | | ASP controls CancelPublish(subscribe_id), Follow-up Transmit( ) using relation between search_id corresponding to return value of SeekService( )and subscribe_id |

And, parameters for calling Subscribe( ) method of NAN can be summarized as Table 6 in the following.

TABLE 6

- matching_filter_tx
- matching_filter_rx
- configuration_parameters
   A.     Subscribe type
     iii.   Determines the type of Subscribe as follows
        1.  Passive
        2.  Active
   B.     Discovery range
     iv.   Determines whether the service is searched in close proximity only or in any NAN Devices within range
   C.     Query period
     v.    Recommended periodicity of query transmissions
   D.     Time to live
     vi.   The instance of the Subscribe function can be commanded to run for a given time interval or until the first DiscoveryResult event
   E.     Matching filter flag
     vii.  Zero (0) if matching_filter_tx is equal to matching_filter_rx
     viii. One (1) if matching_filter_tx is not equal to matching_filter_rx In particular, when a device corresponding to a seeker device calls seekservice( ) method and indicate the method to the ASP, information on an interface among a plurality of interfaces supported by the ASP can be included in the seekservice( ) method. As a different example, when a device corresponding to a seeker device provides information on an interface preferred for a service X corresponding to a specific service to the ASP, the information on the preferred interface can be included in the seekservice( ) method only. In particular, information on an interface necessary for performing a service discovery of a device can be included in the seekservice( ) method.

And, as mentioned in the foregoing description, after the service discovery is performed, the ASP can cancel the service discovery to make the service discovery not to be consistently performed. In this case, for example, the service discovery can be cancelled based on the method shown in Table 7 in the following.

TABLE 7

-CancelPublish( publish_id )
-CancelSubscribe( subscribe_id )
-Transmit( handle, service_specific_info, configuration_parameters )

After the service discovery is performed by an interface, the interface can report a result of the service discovery to the ASP. In this case, information on the result can be reported to the ASP based on a parameter or information different from each other according to each of a plurality of the interfaces.

In this case, for example, a legacy NAN can inform a service of a value of DiscoveryResult (subscribe_id, service specific_info, publish_id, address) via the ASP as an event of discovery result( ). Hence, it is necessary for the discovery result( ) to have additional information or a parameter in consideration of environment in which a plurality of interfaces exist. The additional information or the parameter is shown in Table 8 in the following. In particular, it is necessary to further report information on an interface capable of performing service connection among a plurality of interfaces.

In this case, WLAN infrastructure information corresponding to information provided via NAN may not be connected WLAN information. In this case, for example, it may be able notify an attribute for the connected WLAN information by adding a connected WLAN attribute.

As a different example, when a service discovery is performed via NAN, a service name can be provided only while device name information is not known. In this case, since it is difficult to perform discovery using the service name only, it may further add information on a device name. In this case, for example, it may be able to include the abovementioned information to legacy attribute information as a device name and/or a user friendly device name. As a different example, when a service discovery is performed via NAN, since it is unable to know a service status, it is necessary to further add information on a service descript attribute.

In particular, when a service discovery is performed via NAN and a result of the service discovery is reported, information for enhancing convenience of discovery and information necessary for connection can be added, by which the present invention may be non-limited.

TABLE 8

-Service_ID/service_name corresponds to value filtered by publish( )/subscribe( )
-Connectivity method per service / Connectivity method
  1.    P2P
  2.    WLAN Infrastructure
  3.    BT
-MAC address of remote P2P device per band
-MAC address of remote STA per band
-BSSID of the RAN Infrastructure per band And, for example, it is necessary for BLTE to have additional information or parameter in discovery result( ) in consideration of environment in which a plurality of interface exist. The additional information or parameter is shown in Table 9. In particular, it is necessary to further report information on an interface capable of performing service connection among a plurality of interfaces.

TABLE 9

- Advertisement_ID⁾
-Service_ID/service_name⁾
  1. Service status⁾
- Connectivity method per service / Connectivity method⁾
  1. P2P⁾
    A. Listen band/channel/time⁾
  2. WLAN Infrastructure⁾
    A. Listen band/channel/time⁾
  3. BT⁾
    A. Listen band/channel/time⁾
- MAC address of remote P2P device per band⁾
- MAC address of remote STA per band⁾
- BSSID of the WLAN Infrastructure per band.⁾

In the foregoing description, when a device performs a service discovery and a service connection using ASP, parameters or information to be included in each method or a frame are described based on a plurality of interfaces.

In the following, a procedure of performing a service discovery using a different interface and then performing a service connection and a series of procedures for connection capability exchange (CCE) that exchanges connection capable information are explained.

More specifically, a device can use P2P as a service discovery interface. In this case, when the device corresponding to a seeker device performs a service discovery using the ASP, the device can include information on a service connection method in a probe request frame. In this case, for example, the probe request frame can include at least one selected from the group consisting of information on a preferred frequency band, information on infrastructure connectivity, and information on NAN data connection. In particular, the seeker device can transmit the probe request frame in a manner of including information necessary for service connection in the probe request frame, by which the present invention may be non-limited.

Subsequently, an advertiser device can transmit a probe response frame in response to the probe request frame. In this case, the probe response frame can include service connection information on a corresponding service. In this case, for example, the advertiser device can include information on a frequency band capable of supporting P2P or WLAN infrastructure in the probe response frame. And, the advertiser device can include at least one selected from the group consisting of information on P2P connectivity, information on infrastructure connectivity, and information on NAN data connection in the probe response frame. In this case, for example, the information on the infrastructure connectivity may correspond to BSSID information and/or SSID information.

And, for example, the information on the NAN data connection may correspond to information on a cluster ID and/or information on a group ID.

Subsequently, the seeker device can transmit a service information request as interface information for a service connection to a service discovery request frame. For example, the seeker device can transmit the service information request to the service discovery request frame by setting the service information request to 1. In particular, the seeker device can request interface information for a service connection via the service discovery request frame, by which the present invention may be non-limited. In this case, an advertiser device can include service information on all service connections capable of being supported in a service response frame. For example, the advertiser device can include MAC address information of the advertiser device in the service response frame. In particular, the seeker device transmits a frame in a manner of including information on a preferred service connection in the frame and the advertiser device transmits a frame in a manner of including information on a service connection capable of being supported in the frame.

Subsequently, the seeker device can select a device and a service using information on a result of the service discovery. In this case, the information on the result of the service discovery is shown in Table 10 in the following. In particular, the seeker device can obtain information necessary for performing service connection using the result of the service discovery, by which the present invention may be non-limited.

TABLE 10

- The output of search results ⁾
  1. Search_id⁾
    A. Returned by the SeekService Method⁾
  2. Service_mac⁾
    A. The remote P2P device address⁾
  3. Service_device_name⁾
    A. The WSC-defined name of the remote P2P device⁾
  4. Service_name⁾
  5. Service_information⁾
  6. Service_status⁾
  7. Connectivity method⁾
    A. P2P⁾
      i.Band Info⁾
    B. Infra. Structure⁾
      i. Band Info.⁾

Subsequently, ASP can select an interface from among a plurality of interfaces for a service connection and the service connection can be performed based on the selected interface.

In this case, for example, the seeker device calls conenctsession( ) to perform the service connection. In this case, for example, the conenctsession( ) can include information shown in Table 11 in the following.

TABLE 11

- List of (service_mac, advertisement_id)⁾
1. MAC address of remote P2P device⁾
2. Advertisement_id⁾
  - Session_information⁾
  - Network_role⁾
  - Network_config⁾
  - Returns⁾
  1. Session_mac⁾
  2. Session_id⁾

If service connection is performed based on P2P, Table 11 can further include information on a feature capability per service (network type for ASP Coordination Protocol, CP).

After the connectsession( ) is called, the seeker device can transmit a provisional discovery (PD) request frame. In this case, for example, a legacy PD request frame includes Status attribute, Session Information Data Info, Advertisement ID Info, Configuration Timeout, Session ID Info, Feature Capability, etc. for selecting an attribute only as information necessary for connecting infrastructure. Yet, since it is able to perform a service connection via infrastructure as an interface, the PD request frame can include at least one selected from the group consisting of a BSSID, a MAC address of the seeker device, a MAC address of the advertiser device, and information on a plurality of frequency bands.

And, a PD response frame, which is transmitted in response to the PD request frame, can include Status attribute, Session Information Data Info, Advertisement_ID Info, Configuration Timeout, Session ID Info, Feature Capability, etc. for selecting an attribute only as information necessary for connecting infrastructure. Yet, since it is able to perform a service connection via infrastructure as an interface, the PD request frame can include at least one selected from the group consisting of a BSSID, a MAC address of the seeker device, a MAC address of the advertiser device, information on a plurality of frequency bands, and information on capability.

When the connectsession( ) is called, if a service connection is performed via infrastructure rather than P2P, the PD request frame and the PD response frame are exchanged, the service connection is completed, and an ASP session can be established. In this case, if the service connection is performed via the infrastructure, it may be necessary to adjust a part of values shown in Table 11. It is shown in Table 12 in the following.

TABLE 12

- List of (service_mac, advertisement_id)ᵃ
1. MAC address of remote P2P deviceᵃ
2. Advertisement_idᵃ
- Session_informationᵃ
1. For Infra. connectionᵃ
- Network_role :No needᵃ
- Network_configᵃ
- Returnsᵃ
1. Session_macᵃ
2. Session_idᵃ

And, for example, when the ASP performs a connection via infrastructure as a service connection interface, it may be necessary for the ASP to perform seamless handover to a P2P connection. In particular, a device may change the service connection interface to P2P from the infrastructure. In this case, for example, the device performs a procedure of exchanging a P2P PD request frame and a response frame while a service is in use to perform P2P ASP session setup. In this case, a group is formed while the procedure of exchanging the P2P PD request frame and the response frame is performed and it may be mandatory to perform a procedure of assigning an IP address. In this case, for example, an auto_accept parameter is set to "true" and a P2Ps default configuration method is used only for the seamless handover. When the handover is performed, in order to prevent delay, it may be able to use a previously existing a P2P group via CCE negotiation or it may automatically become a group owner (GO). And, for example, in order to prevent delay, it may apply a group only when the group corresponds to a persistent group.

And, for example, when a device exchanges a PD request frame and a PD response frame in an infrastructure connection state, the device can perform CCE negotiation and feature capability negotiation in advance. By doing so, the device is able to check information necessary for making a handover to a P2P connection in advance. In this case, for example, it may not additionally perform a service config methods (provisioning) procedure in the procedure of exchanging the PD request frame and the PD response frame.

As a different example, in case of using P2P as a discovery connection method, a procedure of exchanging a PD request frame and a response frame for P2P connection can be performed in advance in a procedure of exchanging a PD request frame and a response frame for infrastructure connection to establish a connection in a P2P layer 2 in advance.

If necessary, it may be able to configure an ASP session setup to be performed only, by which the present invention may be non-limited.

As a further different example, a device can use infrastructure as an interface for performing service discovery. In this case, a device/service discovery request frame and a device/service discovery response frame can be exchanged. In this case, for example, the device/service discovery request frame can include service_name, exact_search, STA's MAC address of requestor, service_information_request, and the like and the device/service discovery response frame can include corresponding information.

And, for example, after a service discovery is performed using the infrastructure, it may be necessary to exchange a PD request frame and a PD response frame for the infrastructure. This can be performed for a connection between devices, which are connected to the infrastructure, after the service discovery is performed. In this case, for example, information or a parameter included in the PD request frame and the PD response frame may be identical to information included in a PD request frame and a PD response frame, which are exchanged to perform a service discovery using P2P.

And, for example, a service discovery is performed using infrastructure and a service connection can be performed using P2P. In this case, for example, a PD request frame is transmitted via the infrastructure and a PD response frame can be transmitted via a P2P interface. In this case, for example, if there is no response in response to the P2P response frame, it can be determined as an RSSI level is very low.

And, for example, similar to tunneled direct link setup (TDLS), a device/service discovery request is performed via infrastructure, a response is performed via P2P, an I-PD request frame and an I-PD response frame are exchanged via the infrastructure, and ASP session setup can be performed via P2P. In this case, for example, the I-PD request frame and the I-PD response frame can include information on a plurality of frequency bands and P2P device information on a requester and a responder.

As a further different example, a device can perform a service discovery via NAN. In this case, it may be necessary for the device to have information on a NAN connection capability attribute to use ASP. In this case, for example, the NAN connection capability attribute may indicate whether or not there is a device capable of being connected via an AP. And, for example, it may be necessary to provide additional information on the NAN connection capability attribute to the ASP via further availability map (FA map). In this case, for example, the FA map can include information on a connected BSSID and information on device's infrastructure interface address. In this case, for example, if a service discovery is performed via NAN, specific information on each interface can be provided via a service discovery frame (SDF) within a discovery window (DW) period. As a different example, it may separately perform an additional NAN service discovery. In this case, for example, it may not separately perform an additional action or frame exchange for exchanging a GAS frame in P2Ps.

When a service discovery is performed via NAN, it may exchange a PD request frame and a PD response frame. In this case, for example, the PD request frame and the PD response frame can be referred to as an N-PD request frame and an N-PD response frame, respectively. In this case, for example, if the N-PD request frame and the N-PD response frame are used for a P2P connection, the N-PD request frame and the N-PD response frame can be exchanged in a further access window (FAW) via a P2P operation attribute and FA map. And, for example, if the N-PD request frame and the N-PD response frame are used for an infrastructure connection, the N-PD request frame and the N-PD response frame can be exchanged in a FAW based on attribute information on a connected AP and FA map. As a different example, if the N-PD request frame and the N-PD response frame are used for a NAN data connection, the N-PD request frame and the N-PD response frame can be exchanged in a FAW based on attribute information on a NAN data and FA map.

And, a device can also perform a service discovery via NFC or BLTE. As a different example, the device may use a combination of a plurality of service discovery methods. For example, if the device fails to perform a service discovery using BLTE, the device can configure a different supportable interface to be triggered. In this case, for example, one or more interfaces can be combined with each other, by which the present invention may be non-limited.

And, for example, when a service connection is performed, it may be necessary to perform exchange on an authentication capability. More specifically, when an interface is selected, a service connection is performed via the selected interface, and an ASP session is formed, it may be able to configure each mode based on authentication capability. In this case, for example, it may be able to configure a secure mode for security. In this case, for example, the secure mode can configure authentication to be performed before two devices establish an ASP session via a service connection. As a different example, an open mode can configure an ASP session to be established without authentication. In particular, it may be able to add an authentication procedure while a service connection is performed after a service discovery is performed in consideration of security, by which the present invention may be non-limited.

Figure 12:
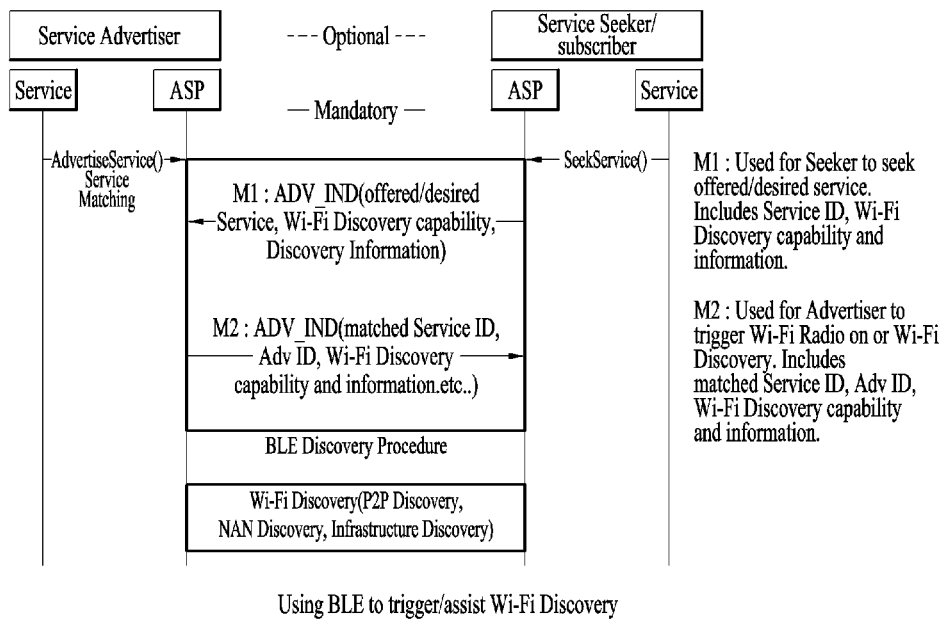
FIG. 12 is a diagram for a method of performing a service discovery using Bluetooth (Bluetooth low energy (BLE))

FIG. 12 is a diagram for a method of performing a service discovery using Bluetooth (Bluetooth low energy (BLE)).

As mentioned in the foregoing description, when a device performs a device/service discovery, the device may use at least one of a plurality of interfaces. In this case, for example, if the device is unable to use a service discovery as an interface for performing the service discovery, the device can perform the service discovery again via a predetermined different interface. In this case, the predetermined different interface can be configured based on a service. And, the predetermined different interface can be independently configured by an ASP. As a different example, if the device fails to perform a service discovery, the device may use a plurality of interfaces based on a prescribed order. As a further different example, if a service discovery is not performed within predetermined time or time set by a timer, the device can perform the service discovery using a different interface.

More specifically, when a device performs a service discovery using P2P, if the device fails to perform the service discovery, the device triggers at least one selected from the group consisting of NAN, infrastructure, NFC, and BLE and may be able to perform the service discovery using the selected interface.

And, for example, referring to FIG. 12, the device can perform the service discovery via BLE. In this case, for example, the device can perform the service discovery via the BLE in a manner of exchanging a message or a frame. For example, referring to FIG. 12, a seeker device transmits an M1 message to an advertiser device and the advertiser device can transmit an M2 message to the seeker device. In this case, each of the messages (M1 and M2) includes parameters for performing the service discovery. The parameters are shown in Table 13 in the following. In particular, when the service discovery is performed via the BLE, each of the messages can include prescribed information for performing the service discovery.

In this case, for example, a service ID can be included in both the M1 message and the M2 message. And, an advertisement ID can be included in the M2 message transmitted by the advertiser device only. As a different example, regarding Wi-Fi discovery capability, the M1 message transmitted by the seeker device can include information on a plurality of interfaces and the M2 message transmitted by the advertiser device can include information on a selected interface.

And, Wi-Fi discovery information can be included in both the M1 message and the M2 message. In this case, according to one embodiment, Table 13 in the following may include different information or parameter, by which the present invention may be non-limited.

TABLE 13

| Parameters | Description | Length | Messages |
|---|---|---|---|
| Service ID | As defined in WFDS | 6 | M1, M2 |
| Adv ID | As defined in WFDS | 4 | M2 |
| Wi-Fi Discovery Capability | Indication(bitmap) of support of P2P, Infrastructure, NAN, etc | 1 Octects | M1 : Multiple Choice M2 : one |
| Wi-Fi Discovery Information | A set of Wi-Fi connection information to assist to start Wi-Fi discovery P2P(8) : Device ID(6) Channel/Band(2) NAN(12) : NAN address(6) + Cluster ID(6) if available | 8 or 12 Octects | M1,M2 |

And, for example, after the service discovery is performed via the BLE, it may be able to perform Wi-Fi discovery using the aforementioned parameter information to exchange additional information. In this case, it may be able to use at least one selected from the group consisting of WLAN infrastructure, P2P, and NAN to perform the Wi-Fi discovery. In this case, the device can select an interface for performing the Wi-Fi discovery based on capability information on the WLAN infrastructure, the P2P, and the NAN. In this case, for example, when the interface for performing the Wi-Fi discovery is selected and notified based on the capability information, it may be necessary to include information indicating whether or not a connection is connected to the same BSSID in the capability information. And, for example, MAC/interface address information of an AP device can be included in the capability information. In particular, the aforementioned information can be included in the message exchanged in the procedure of performing the service discovery via the BLE.

More specifically, when the service discovery is performed, the capability information can include information indicating capability of the device in a bitmap or an index form. In this case, for example, in case of using WLAN infrastructure as an interface for performing the Wi-Fi discovery, since it is necessary to have BSSID information as MAC address information of a connected AP, the aforementioned information can be included in the message for performing the BLE service discovery. And, for example, information on an available band among a plurality of frequency bands can also be included in the message for performing the BLE service discovery. Besides, information necessary for using the WLAN infrastructure can be delivered in advance in a manner of being included in the message for performing the BLE service discovery, by which the present invention may be non-limited.

And, for example, if P2P or NAN is selected as an interface for performing the Wi-Fi discovery, relevant information can be included in the message for performing the BLE service discovery, by which the present invention may be non-limited.

Figure 13:
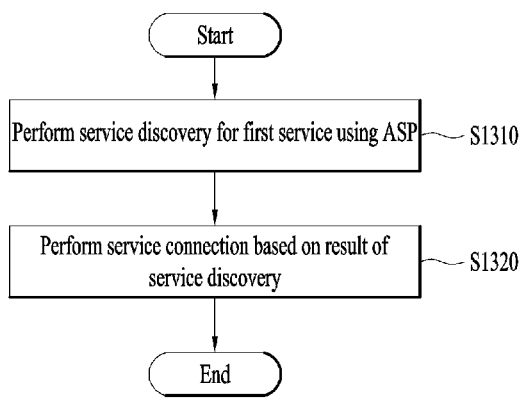
FIG. 13 is a flowchart of a method for a device to support a service using an ASP according to one embodiment of the present invention.

FIG. 13 is a flowchart of a method for a device to support a service using an ASP according to one embodiment of the present invention.

A device can perform a service discovery for a first service using an ASP [S1310]. In this case, as mentioned earlier in FIGS. 10 to 12, when the device performs the service discovery for the first service, the device can use at least one of a plurality of interfaces. In this case, for example, since it is difficult for a legacy ASP to support or interwork with a plurality of the interfaces, it is necessary for the ASP to check additional information or a parameter in consideration of environment supporting a plurality of the interfaces. Hence, as mentioned in the foregoing description, information on a plurality of the interfaces or information for supporting parameters can be included in the ASP.

Subsequently, the device can perform a service connection based on a result of the service discovery [S1320]. In this case, as mentioned earlier in FIGS. 10 to 12, the device can perform the service connection using the result of the service discovery. In this case, the device may use at least one interface among a plurality of the interfaces for the service connection. In this case, for example, an interface for performing the service discovery and an interface for performing the service connection may be different from each other. And, as mentioned in the foregoing description, the ASP can include information or a parameter for supporting a plurality of the interfaces.

Figure 14:
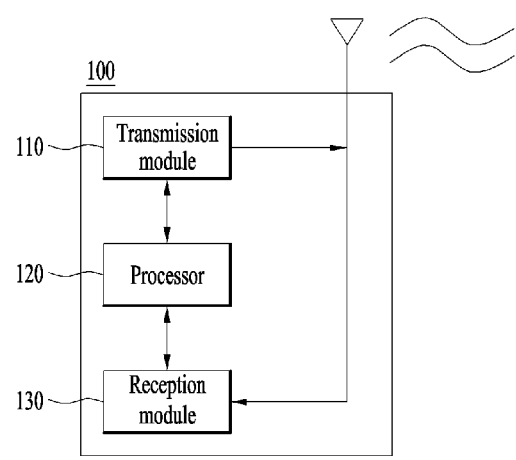
FIG. 14 is a block diagram for a device according to one embodiment of the present specification.

FIG. 14 is a block diagram for a device according to one embodiment of the present specification.

A device may correspond to a device capable of supporting a plurality of the interfaces. In this case, the device 100 can include a transmission module 110 configured to transmit a radio signal, a reception module 130 configured to receive a radio signal, and a processor 120 configured to control the transmission module 110 and the reception module 130. In this case, the device 100 can perform communication with an external device using the transmission module 110 and the reception module 130. In this case, the external device may correspond to a different device. For example, the external device may correspond to a different device connected via P2P or an AP or a non-AP connected via WLAN infrastructure. As a different example, the external device may correspond to a base station. In particular, the external device may correspond to a device capable of performing communication with the device 100, by which the present invention may be non-limited. The device 100 can transmit and receive digital data such as contents using the transmission module 110 and the reception module 130.

According to one embodiment of the present specification, the processor 120 of the device 100 performs a service discovery for a first service using the ASP and can perform a service connection based on a result of the service discovery. In this case, if the ASP supports a plurality of service discovery interfaces and a plurality of service connection interfaces, as mentioned in the foregoing description, the service discovery is performed using at least one of a plurality of the service discovery interfaces and the service connection can be performed using at least one of a plurality of the service connection interfaces. And, the processor 120 of the device 100 can receive information on a service discovery interface and a service connection interface capable of supporting the first service from the ASP. In this case, the processor of the device 100 transmits a request message for requesting first service supporting information to the ASP using the transmission module 110 and can receive a response message via the reception module 130 in response to the request message. By doing so, the processor 120 of the device 100 can receive the information on the service discovery interface and the service connection interface.

And, the processor 120 of the device 100 transmits a request frame for the first service using the transmission module 110 and receives a response frame using the reception module 130 in response to the request frame. By doing so, it may be able to perform the service discovery for the first service. In this case, the request frame and the response frame can include information on a service discovery interface for performing the service discovery among a plurality of service discovery interfaces. And, the request frame and the response frame can include information on a service connection interface for performing the service connection among a plurality of service connection interfaces.

When the service discovery for the first service is performed based on a first service discovery interface among a plurality of the service discovery interfaces, if it fails to perform the service discovery using the first service discovery interface, the processor 120 of the device 100 can trigger a second service discovery interface among a plurality of the service discovery interfaces. In this case, as mentioned in the foregoing description, a specific interface can be selected from among a plurality of the interfaces. In this case, for example, if the first service discovery interface fails to perform the service discovery within first time, the processor 120 of the device 100 can trigger the second service discovery interface.

And, for example, the processor 120 of the device 100 can perform the service discovery for the first service via BLE. In this case, it may further perform a Wi-Fi discovery. In this case, the processor 120 can receive information on a plurality of service connection interfaces capable of being used for performing a service connection via the Wi-Fi discovery. In this case, if a device corresponding to a seeker device transmits a first message to a device corresponding to an advertiser device via BLE and the advertiser device transmits a second message to the seeker device via BLE, a service discovery can be performed. In this case, the first message and the second message can include Wi-Fi capability information capable of performing the Wi-Fi discovery. And, if the Wi-Fi discovery is performed using WLAN infrastructure, the first message and the second message can further include information on the WLAN infrastructure. In this case, the information on the WLAN infrastructure can include at least one selected from the group consisting of information on a BSSID, information on a frequency band, and information on a channel.

The embodiments of the present invention may be achieved by various means, for example, hardware, firmware, software, or a combination thereof.

In a hardware configuration, the methods according to exemplary embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, an embodiment of the present invention may be implemented in the form of a module, a procedure, a function, etc. Software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

And, both an apparatus invention and a method invention are explained in the present specification and the explanation on both of the inventions can be complementally applied, if necessary.

INDUSTRIAL APPLICABILITY

Although the present invention explains a method for a device to support a service using a service platform in a wireless communication system, the method can be applied to various wireless communication systems.

What is claimed is:

1. A method of supporting a service supported by a device using an application service platform (ASP) in a wireless communication system, the method comprising:
performing a service discovery for discovering a first service provided by another device using a service discovery interface among a plurality of different service discovery interfaces supported by the ASP,
wherein the service discovery for the first service is performed via one of P2P (peer to peer), NAN (neighbor awareness network), BLE (Bluetooth low energy), and NFC (near field communication), and
wherein the device transmits a request message for requesting information supporting the first service to the ASP and receives information on a service discovery interface and a service connection interface capable of supporting the first service from the ASP via a response message in response to the request message;
performing a first service connection using a WLAN (wireless local access network) infrastructure service connection interface among a plurality of different service connection interfaces supported by the ASP for communicating via the WLAN based on a result of the service discovery; and
handing over the first service connection to a second service connection using a P2P service connection interface among the plurality of different service connection interfaces supported by the ASP to perform P2P communication with a P2P device including the first service,
wherein whether the device becomes a P2P group owner or a P2P client in the specific P2P group is determined during the performing the first service connection to prevent delay in the handing over of the first service connection to the second service connection,
wherein the specific P2P group is a persistent P2P group, and
wherein one P2P group owner exists in the specific P2P group and all other devices in the P2P group are P2P client devices.

2. The method of claim 1, wherein the service discovery for the first service is performed when the device transmits a request frame for the first service and receives a response frame in response to the request frame.

3. The method of claim 2, wherein the request frame and the response frame comprise information on a service discovery interface performing the service discovery.

4. The method of claim 2, wherein the request frame and the response frame comprise information on a service connection interface performing the service connection.

5. The method of claim 1, wherein when the service discovery for the first service is performed based on a first discovery interface among the plurality of the different service discovery interfaces, if it fails to perform the service discovery using the first service discovery interface, a second service discovery interface among the plurality of the different service discovery interfaces is triggered.

6. The method of claim 5, wherein the second service discovery interface is triggered when the first service discovery interface fails to perform the service discovery within a first time.

7. The method of claim 1, wherein a Wi-Fi discovery is further performed when the service discovery for the first service is performed via BLE (Bluetooth low energy), and
wherein the device receives information on service connection interfaces capable of being used for the service connection via the Wi-Fi discovery.

8. The method of claim 7, wherein the service discovery is performed and a first message and a second message comprise Wi-Fi discovery capability information capable of performing the Wi-Fi discovery when a seeker device transmits the first message to an advertiser device via the BLE and the advertiser device transmits the second message to the seeker device via the BLE.

9. The method of claim 8, wherein the first message and the second message further comprise information on the WLAN infrastructure when the Wi-Fi discovery is performed using the WLAN infrastructure.

10. The method of claim 9, wherein the information on the WLAN infrastructure comprises at least one selected from the group consisting of information on a BSSID (basic service set identifier), information on a frequency band, and information on a channel.

11. A device using an application service platform (ASP) in a wireless communication system, comprising:
a receiver and a transmitter; and
a processor operatively coupled to the receiver and the transmitter, and configured to:
perform a service discovery for discovering a first service provided by another device using a service discovery interface among a plurality of different service discovery interfaces supported by the ASP,
wherein the service discovery for the first service is performed via one of P2P (peer to peer), NAN (neighbor awareness network), BLE (Bluetooth low energy), and NFC (near field communication), and
wherein the device transmits a request message for requesting information supporting the first service to the ASP and receives information on a service discovery interface and a service connection interface capable of supporting the first service from the ASP via a response message in response to the request message; and perform a first service connection using a WLAN (wireless local access network) infrastructure service connection interface among a plurality of different service connection interfaces supported by the ASP for communicating via the WLAN based on a result of the service discovery; handing over the first service connection to a second service connection using a P2P service connection interface among the plurality of different service connection interfaces supported by the ASP to perform P2P communication with a P2P device including the first service, wherein whether the device becomes a P2P group owner or a P2P client in the specific P2P group is determined during the performing the first service connection to prevent delay in the handing over of the first service connection to the second service connection, wherein the specific P2P group is a persistent P2P group, and wherein one P2P group owner exists in the specific P2P group and all other devices in the P2P group are P2P client devices.

12. The method of claim 1, wherein the performing the first service connection further comprising:

transmitting a PD (provisional discovery) request frame; and receiving a PD response frame, and wherein a P2P layer 2 connection is performed during the transmitting the PD request frame and the receiving the PD response frame.

* * * * *